April 27, 1926.
R. F. PAGE
HOIST
Filed Nov. 11, 1925
1,582,076
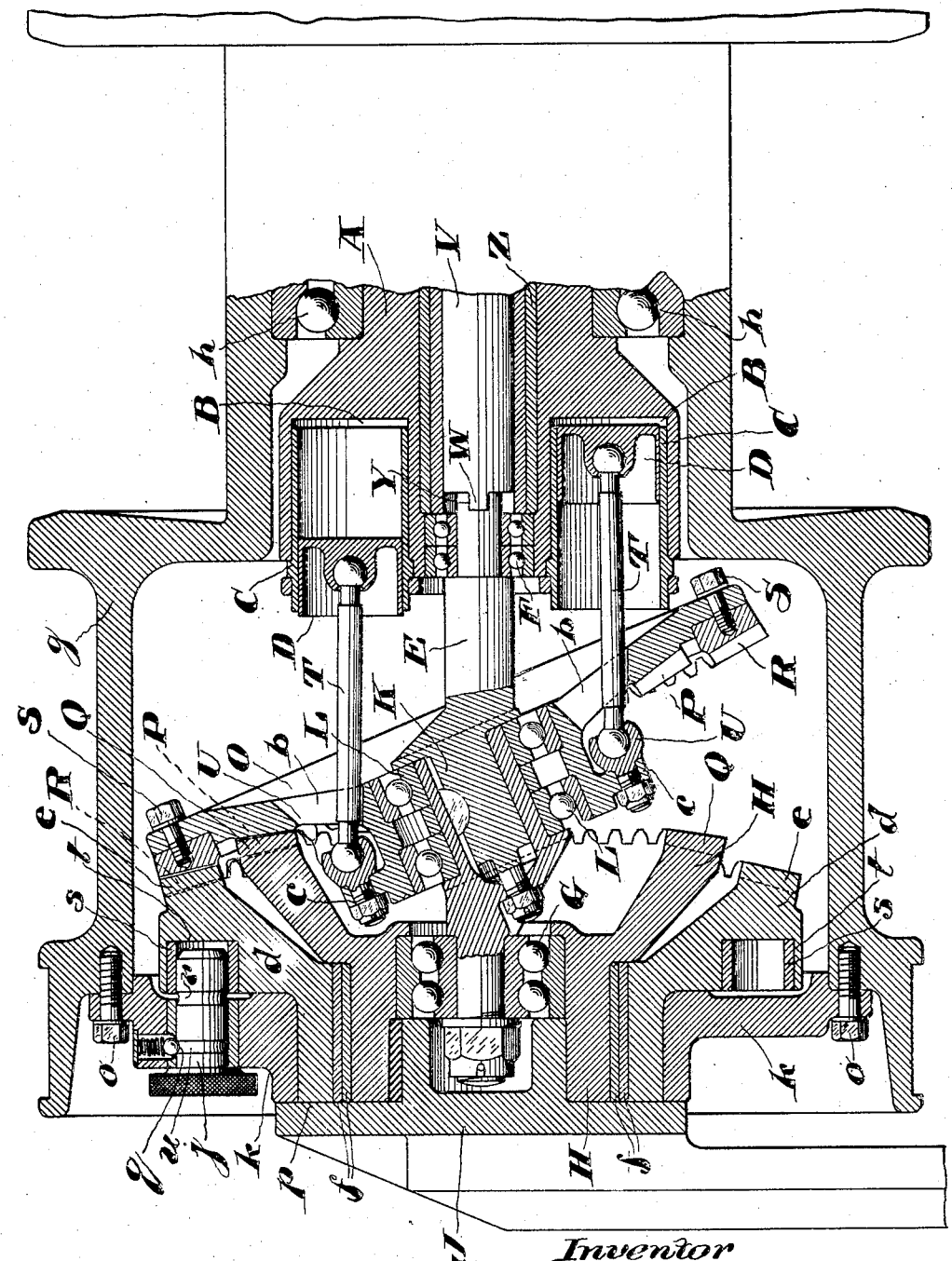
Inventor
Robert F. Page, deceased
John M. Felt, Administrator.
BY Herbert G. Ogain
HIS ATTORNEY.

Patented Apr. 27, 1926.

1,582,076

UNITED STATES PATENT OFFICE.

ROBERT F. PAGE, DECEASED, LATE OF ATHENS, PENNSYLVANIA; BY JOHN M. FELT, ADMINISTRATOR, OF ATHENS, PENNSYLVANIA, ASSIGNOR TO INGERSOLL-RAND COMPANY, OF JERSEY CITY, NEW JERSEY, A CORPORATION OF NEW JERSEY.

HOIST.

Application filed November 11, 1925. Serial No. 68,257.

*To all whom it may concern:*

Be it known that ROBERT F. PAGE, deceased, late a citizen of the United States, and a resident of Athens, in the county of Bradford and State of Pennslyvania, did invent a certain Hoist, of which the following is a specification accompanied by drawings.

This invention relates to hoists and more particularly to an arrangement of fluid actuated cylinders and pistons adapted to transmit power to a rope drum in a novel manner through reduction gearing having relatively few movable parts.

The objects of the invention are to enable the rolling type of differential gearing to be operated directly by motive fluid actuated pistons and to enable the same to be conveniently assembled within a rope drum whereby a compact and efficient construction is secured.

Other objects and advantages of the invention will be in part obvious and in part pointed out hereinafter.

The drawing illustrates a preferred form of the invention embodied in a hoist, the view being a longitudinal section in elevation through a portion of the hoist.

Referring to the drawing, the hoist comprises a stationary central member A having a plurality of cylinders B longitudinally disposed about the axis of the hoist, each cylinder having a suitable wearing liner C mounted therein. Each cylinder is provided with a piston D adapted to reciprocate within the cylinders being operated by motive fluid as is well known in the art. A shaft E axially disposed in the stationary member A and journaled therein by means of suitable anti-friction bearings F extends parallel to the axis of the cylinder and is journaled at its opposite end by means of anti-friction bearings G in an inner stationary crown gear H mounted on a stationary end frame member J. The shaft E is provided between its ends with a portion K upon which are mounted suitable anti-friction bearings L having their axis of rotation at an angle to the axis of the shaft E. The bearings L serve to support a gear member O which is provided with an inner set of gear teeth P meshing with the teeth Q of the crown gear H, and an outer set R of gear teeth which may be a separately formed ring gear bolted by means of suitable bolts S at the periphery of the gear member O. The gear member O being tilted with respect to the shaft E will cause rotation of the shaft E as it rolls about and since the teeth Q of the inner crown gear H are meshed with the teeth P of the gear member O, the said gear member cannot rotate although it may roll at the same time that the shaft E rotates. Such rolling motion is produced in the gear member O by connecting rods T connected at one end to the pistons C and attached at the other end by means of suitable sockets U bolted to the gear member O.

Distribution of motive fluid to and from the cylinders B is controlled by a suitable valve V preferably of a rotary type and directly connected by a castellated end W to a castellated end Y of the shaft E. A sleeve bearing Z for the valve V is mounted in the stationary member A to provide a durable wearing surface for the valve. The ports and passages for distributing the motive fluid are not shown in the valve V, it being understood that any suitable type of rotary valve may be provided to successively actuate the pistons D.

To economize space, especially length, the gear member O is provided with apertures $b$ in its face through which connecting rods T extend to be engaged by the sockets which are supported on a flange $c$ on the opposite face of the gear member O with respect to the slots $b$.

To produce a rotary motion of relatively slow speed, the outer set of teeth on the gear member O are adapted to engage an outer crown gear $d$ having a lesser number of teeth $e$ than is provided in the set of teeth R. The crown gear $d$ is suitably journaled by means of sleeves $f$ on the inner crown gear H and is free to rotate thereon. The outer crown gear $d$ is adapted to drive the rope drum $g$, which is in part supported by the outer crown gear and suitable anti-friction bearings $h$ on the stationary member A. Engaging and disengaging means may be provided consisting of a manually operable clutch pin $j$ mounted in a ring $k$ bolted by means of the screws $o$ to the drum $g$ and forming a bearing at a cylindrical face $p$ on the outer crown gear $d$. The clutch pin $j$ is adapted to be pulled out to disengage the drum $g$ from the crown gear $d$ in which position a spring pressed ball detent $q$ is arranged to engage a groove $r$. Pushed inwardly, the clutch pin $j$ is adapted to engage one of a series of sleeves $s$ in suitable bores $t$ in the adjacent face of the crown gear $d$. The clutch pin $j$ is held in its engaged position by the detent ball $q$ engaging the pin $j$ at a groove $u$ in the outer surface of the clutch pin.

The transmission of power from the pistons C to the rope drum $g$ is as follows: Assuming that the pistons C are actuated by motive fluid in succession, the connecting rods T transmit the thrust of the piston C to the gear member $o$ causing it to roll about the axis of the shaft E and producing rotation in the supporting shaft E to rotate the valve V. The gear member O cannot rotate because of the engagement of the inner set of teeth P with the inner crown gear H which has the same number of teeth Q as there are in the set of teeth P. There are, however, more teeth R than there are teeth $e$ in the outer crown gear $d$, this causes a relatively slow rotation in the outer crown gear $d$. For instance, assuming that there are 50 teeth $e$ and 51 teeth R, for each complete roll of the gear member O, the outer crown gear $d$ will have stepped forward one tooth or 1/50 of a revolution. Thus although the pistons C may be operated at a high speed, a relatively slow speed and correspondingly high torque is produced at the outer crown gear $d$. The rotation of the outer crown gear $d$ is transmitted to the rope drum $g$ through the clutch pin $j$ which is adapted to rotate at the same rate of speed as the crown gear $d$.

This motor can be either reversible or non-reversible. Gear E can have more or less teeth than gear R.

Thus by the above described construction are accomplished, among others, the objects above set forth.

Claims:

1. In a hoist, the combination of a plurality of stationary cylinders, pistons within the cylinders and connecting rods attached thereto, a rolling gear member, means to prevent rotation of said gear members, means for attaching said piston rods to said gear to effect the rolling motion of said gear, and a rope drum inclosing said cylinders and gear, and provided with a gear actuated by said rolling gear member.

2. In a hoist, the combination of a plurality of longitudinally disposed cylinders, pistons within said cylinders and connecting rods therefor, an axially disposed shaft, a gear member journaled on said shaft at an angle to the axis of said shaft, said connecting rods being connected to said gear member for producing a rolling motion in said gear member, means for holding said gear against rotation, a rope drum inclosing said cylinder and said gear member and provided with a gear meshing with said rolling gear whereby said rope drum is rotated.

3. In a hoist, the combination of a plurality of longitudinally disposed cylinders, pistons for said cylinders and connecting rods therefor, a valve operating shaft extending axially of the hoist, a gear member journaled on said shaft at an angle to the axis thereof, said gear member having inner and outer sets of gear teeth, a stationary crown gear meshing with the inner set of teeth to prevent rotation of said gear member, and an outer crown gear journaled on the first said crown gear meshing with the outer set of gear teeth of said gear member, means on said gear member associated with said connecting rods to produce a rolling motion in said gear member when said outer crown gear is rotated, and a rope drum inclosing said cylinders and said gears and gear member arranged to be engaged by said outer crown gear for rotation therewith.

4. In a hoist, the combination of a plurality of longitudinally arranged stationary cylinders, pistons for said cylinders, an axially disposed revolving valve operating shaft, a gear journaled on said shaft at an angle to the axis thereof, connecting rods for said pistons arranged to be attached to said gear member to produce a rolling motion thereof about the axis of said shaft, inner and outer sets of gear teeth on said gear member, a stationary crown gear having the same number of teeth as said inner set of gear teeth and meshing therewith to prevent rotation of the gear member, an outer crown gear journaled on said inner crown gear having a lesser number of teeth than said outer set of gear teeth and meshing therewith, and a rope drum inclosing said gears and gear member and said cylinders arranged to be engaged by said outer crown gear for rotation therewith.

In testimony whereof I have signed this specification as administrator.

JOHN M. FELT,
*Sole Administrator of the Estate of Robert F. Page, Deceased.*